United States Patent
Piersol

(10) Patent No.: US 6,978,297 B1
(45) Date of Patent: Dec. 20, 2005

(54) SYSTEM AND METHOD OF MANAGING QUEUES BY MAINTAINING METADATA FILES HAVING ATTRIBUTES CORRESPONDING TO CAPTURE OF ELECTRONIC DOCUMENT AND USING THE METADATA FILES TO SELECTIVELY LOCK THE ELECTRONIC DOCUMENT

(75) Inventor: Kurt Piersol, Santa Cruz, CA (US)

(73) Assignee: Ricoh, Co., Ltd., Tokyo (JP)

( * ) Notice: Subject to any disclaimer, the term of this patent is extended or adjusted under 35 U.S.C. 154(b) by 0 days.

(21) Appl. No.: 09/410,364

(22) Filed: Sep. 30, 1999

Related U.S. Application Data

(63) Continuation-in-part of application No. 09/191,277, filed on Nov. 12, 1998.

(51) Int. Cl.[7] .............................................. G06F 15/173
(52) U.S. Cl. ...................... 709/223; 709/232; 709/220; 707/3; 707/10
(58) Field of Search ................................. 709/220, 223, 709/314, 250, 311, 217, 232; 707/3, 10

(56) References Cited

U.S. PATENT DOCUMENTS

| | | |
|---|---|---|
| 5,163,088 A | 11/1992 | LoCascio |
| 5,222,234 A | 6/1993 | Wang et al. |
| 5,530,899 A | 6/1996 | MacDonald |
| 5,572,583 A | 11/1996 | Wheeler, Jr. et al. |
| 5,708,810 A | 1/1998 | Kern et al. |
| 5,742,816 A | 4/1998 | Barr et al. |
| 5,749,083 A | 5/1998 | Koda et al. |
| 5,793,498 A | 8/1998 | Scholl et al. |
| 5,819,273 A * | 10/1998 | Vora et al. ..................... 707/10 |
| 5,845,304 A | 12/1998 | Iijima |
| 5,848,410 A | 12/1998 | Walls et al. |
| 5,861,959 A | 1/1999 | Barak |
| 5,880,855 A | 3/1999 | Ishikawa |
| 5,905,980 A | 5/1999 | Masuichi et al. |
| 5,907,837 A | 5/1999 | Ferrel et al. |
| 5,916,307 A * | 6/1999 | Piskiel et al. ............... 709/300 |
| 5,923,826 A | 7/1999 | Grzenda et al. |
| 5,923,845 A | 7/1999 | Kamiya et al. |
| 5,946,701 A | 8/1999 | Hamada |
| 5,974,234 A * | 10/1999 | Levine et al. ............... 358/1.16 |
| 5,978,477 A | 11/1999 | Hull et al. |
| 5,999,964 A * | 12/1999 | Murakata et al. ........... 709/201 |
| 6,047,391 A * | 4/2000 | Younis et al. .................. 714/47 |
| 6,058,437 A | 5/2000 | Park et al. |
| 6,288,790 B1 * | 9/2001 | Yellepeddy et al. ....... 358/1.15 |
| 6,373,585 B1 * | 4/2002 | Mastie et al. ............... 358/1.15 |

FOREIGN PATENT DOCUMENTS

| | | |
|---|---|---|
| DE | 44 11 244 A1 | 10/1995 |
| EP | 0 446 149 A1 | 9/1991 |
| FR | 2 646 539 | 11/1990 |

OTHER PUBLICATIONS

Database WPI, Section EI, Week 200019, Derwent Publications, Ltd., London, GB; An 2000-219955, XP002208484 & KR 99 015 263 A.
(Korea Electronic & Telecom Res Inst), Mar. 5, 1999, abstract.

* cited by examiner

*Primary Examiner*—Hosain Alam
*Assistant Examiner*—Philip B. Tran
(74) *Attorney, Agent, or Firm*—Blakely, Sokoloff, Taylor & Zafman LLP

(57) ABSTRACT

A method and apparatus for managing electronic documents within a network. A series of processes perform electronic document capture, indexing, and searching functions within a networked environment. A graphical web-based user interface is provided to facilitate user interaction with the apparatus.

32 Claims, 14 Drawing Sheets

|     | Attribute Name | Meaning |
| --- | --- | --- |
| 410 | FMA ID | Identifier for the FMA which identifier is unique in the world |
| 420 | Serial number | Unique identifier for the document on the NOA |
|     | Document name | The name of the document somehow defined |
| 430 | Document owner | The user/group who currently owns the copy |
| 440 | Document capturer | The user/group who captured the document |
| 445 | Capturer device type | The type of device from which the document was captured |
|     | Capturer device name | The name of device from which the document was captured |
|     | Transport direction | Whether or not the document was incoming, outgoing, with no direction, or with both directions when it was captured. |
| 450 | Capture date | The date when the document was archived |
|     | Creation date | The date when the document was captured by a capturing NOA or the last date it was modified on a PC |
|     | Last read on | The last date when the copy was read |
|     | Location | The location on main disk/backup |
| 490 | Backed Up | The identifier tells whether the document has been backed up and the backup medium where it is |
|     | Public | Whether or not the document is public |
| 480 | Indexed | Whether or not the document is indexed |
|     | Total pages | The number of total pages of the document if known |
| 470 | Compressed | Whether or not the document has been processed by the compression daemon |
| 460 | OCRed | Whether or not the document has been OCR'ed |
|     | Return receipt to | The URL to which the receipt is to be returned after indexing |
|     | Fax number | The fax number of the other party in case that the document is a fax document |
|     | Mail from | The ?from? Header address in case that the document is an e-mail |
|     | Mail to | The ?to? Header address(es) in case that the document is an e-mail |
|     | File to index | The name of the file to be indexed |
|     | Thumbnail | The name of the thumbnail file |
|     | Copy of | The serial number of the original document if it is copied after indexed, the serial number of the document itself otherwise |

FIG. 4

|     | Attribute Name | Meaning |
| --- | --- | --- |
| 510 | FMA ID | Decimal numerical string that represents a positive integer |
| 520 | Serial number | Decimal numerical string that represents a positive integer |
|     | Document name | Any character data |
| 530 | Document owner | String that represents the name of registered user/group; or a comma-separated list of users and/or groups |
| 540 | Document capturer | String that represents the name of registered user/group |
| 545 | Capturer device type | String that represents the type of capturing NOA; Choice of "Copier" "Fax" "Printer" "email" and "PC" |
|     | Capturer device name | String that represents the network name of capturing NOA |
|     | Transport direction | One of "in" "out" "no" and "both" |
| 550 | Capture date | String that represents a UNIX date typically in the format of "YYYYMMDDhhmmss" where the time zone is GMT |
|     | Creation date | String that represents a UNIX date typically in the format of "YYYYMMDDhhmmss" where the time zone is GMT |
|     | Last read on | String that represents a UNIX date typically in the format of "YYYYMMDDhhmmss" where the time zone is GMT |
|     | Location | String that represents a pathname of the directory |
| 590 | Backed Up | Decimal numerical string that represents a nonnegative integer; 0 means the document has not been backed up other number means the identifier of the backup medium |
|     | Public | Boolean string, that is one of "true" and "false" |
| 580 | Indexed | Boolean string, that is one of "true" and "false" |
|     | Total pages | Decimal numerical string that represents a nonnegative Integer; 0 means the number of total pages is unknown other number means the number of total pages |
| 570 | Compressed | Boolean string |
| 560 | OCRed | Boolean string |
|     | Return receipt to | String that represents a URL |
|     | Fax number | Decimal numerical string |
|     | Mail from | String that represents an e-mail address |
|     | Mail to | String that represents an e-mail address |
|     | File to index | String that represents a file name without a directory |
|     | Thumbnail | Same as File to index |
|     | Copy of | Same as Serial number |

FIG. 5

```
<NOA_metadata
    <doc
610     <item name= "FMA ID" value= "2361738294" /
620     <item name= "serial number" value= "883639" /
630     <item name= "document owner" value= "jones" /
640     <item name= "document capturer" value= "jones" /
650     <item name= "capture date" value= "03/29/98 01:17:45 GMT" /
660     <item name= "OCRed" value= "true" /
670     <item name= "compressed" value= "true" /
680     <item name= "indexed" value= "true" /
690     <item name= "backed up" value= "37" /
    </doc
<NOA_metadata
```

FIG. 6

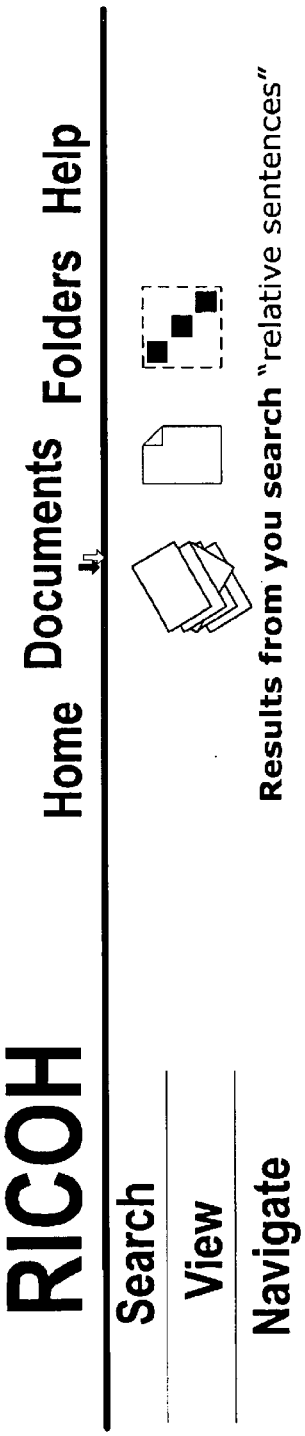
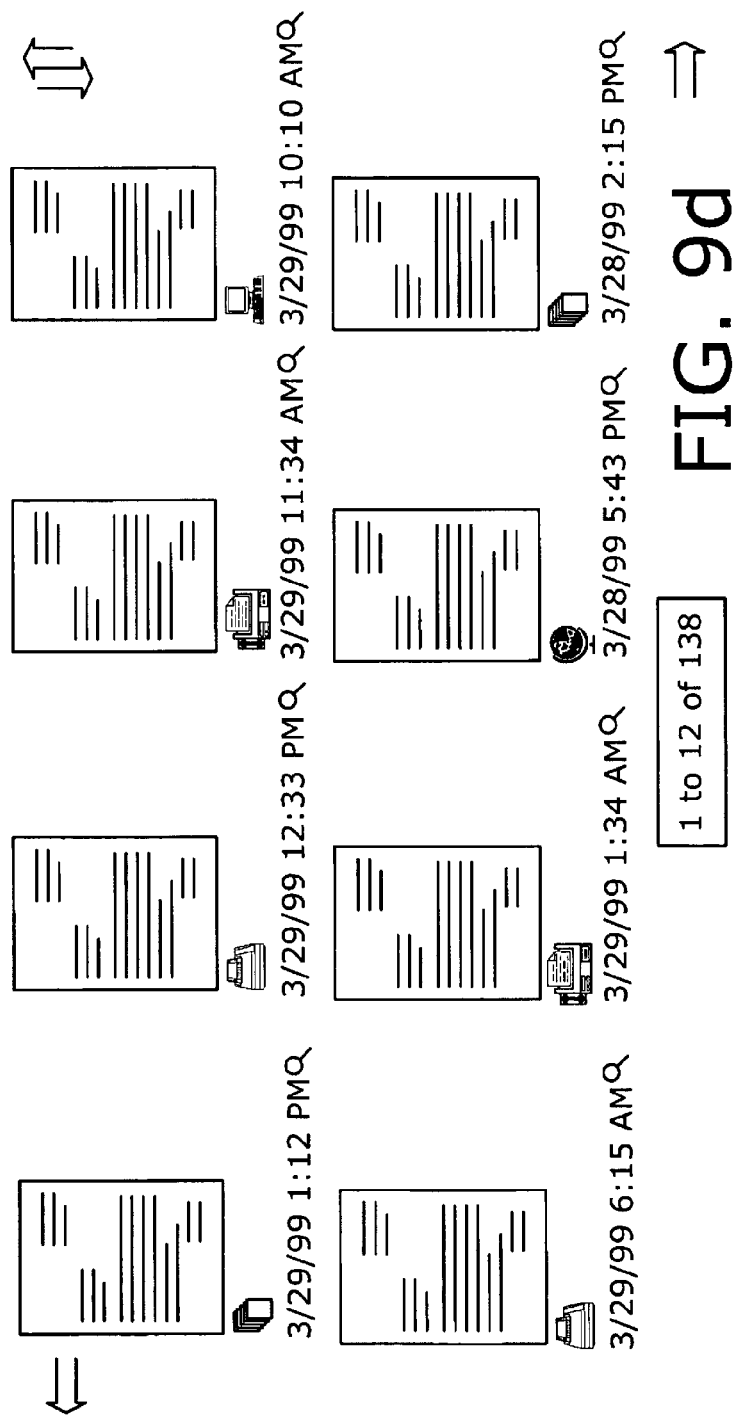
FIG. 9d

SYSTEM AND METHOD OF MANAGING QUEUES BY MAINTAINING METADATA FILES HAVING ATTRIBUTES CORRESPONDING TO CAPTURE OF ELECTRONIC DOCUMENT AND USING THE METADATA FILES TO SELECTIVELY LOCK THE ELECTRONIC DOCUMENT

This nonprovisional application is a continuation-in-part of copending nonprovisional application Ser. No. 09/191,277, filed Nov. 12, 1998, and entitled "Method and Apparatus for Automatic Network Configurations," and copending nonprovisional application Ser. No. 09/191,149 filed Nov. 12, 1998 and entitled "Method and Apparatus for Opportunistic Queue Processing."

FIELD OF THE INVENTION

The present invention relates generally to data processing; more specifically, the present invention relates to asynchronous processing of electronic documents within a system containing at least one file management appliance (FMA).

BACKGROUND OF THE INVENTION

The recent proliferation of digital communication networks, ranging from local area and wide area networks (LAN/WAN) to personal home networks, has created a multitude of pathways through which electronic devices may communicate. The group of devices capable of being networked is no longer limited to just computers, but has expanded to include devices such as printers, copiers, and even facsimile machines to name just a few.

As the number of networked devices continues to grow, so too does the amount of data processed by these devices. It is not uncommon for individuals in an office setting to send and receive large amounts of data in both electronic and printed formats daily.

A large percentage of the data sent and received by individuals tends to be in the form of electronic mail (email). Typically, when an individual receives email they read it and then choose to either save a copy of the message or delete it. Often, individuals will read a particular piece of email and subsequently delete it only to find at a later date that they should have saved the email. Similarly, individuals who save email messages may misplace one or more messages over a period of time. If the individual is located in an office that maintains a systems administrator, they may be able to have the message recovered or found. Unfortunately, however, it is difficult to identify a specific message once it is deleted and searching for a misplaced message can prove time consuming as well.

Electronic data including word processing files, spreadsheet files, and images are not immune to deletion or misplacement either. After creation, these types of files may be sent to another individual in electronic format, or more typically printed out. It is common for an individual working on a draft version of a file to print multiple versions of the file at various times. An individual may unwittingly delete an old version of a file only to discover that the saved version of the file is even older.

It is therefore desirable to have a system that manages electronic files and documents that originate from a variety of sources with reduced, or even minimized, user intervention and provides a straightforward interface for efficient electronic file retrieval.

SUMMARY OF THE INVENTION

A method and apparatus for asynchronous processing of electronic documents is provided. Data is captured on a first device and then at least part of the captured data is transparently communicated to a second device. The second device orders the transparently communicated data into one or more queues, performs one or more processing operations on the one or more queues, accepts one or more queries pertaining to the captured data, and responds to the one or more queries by displaying query results.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a table illustrating a first embodiment of an FMA metadata file format.

FIG. 5 is a table illustrating a second embodiment of an FMA metadata file format.

FIG. 6 illustrates one embodiment of an FMA metadata file in extensible markup language (XML) format.

FIG. 9D illustrates an exemplary FMA query results page showing a thumbnail view.

DETAILED DESCRIPTION

Figure 1:
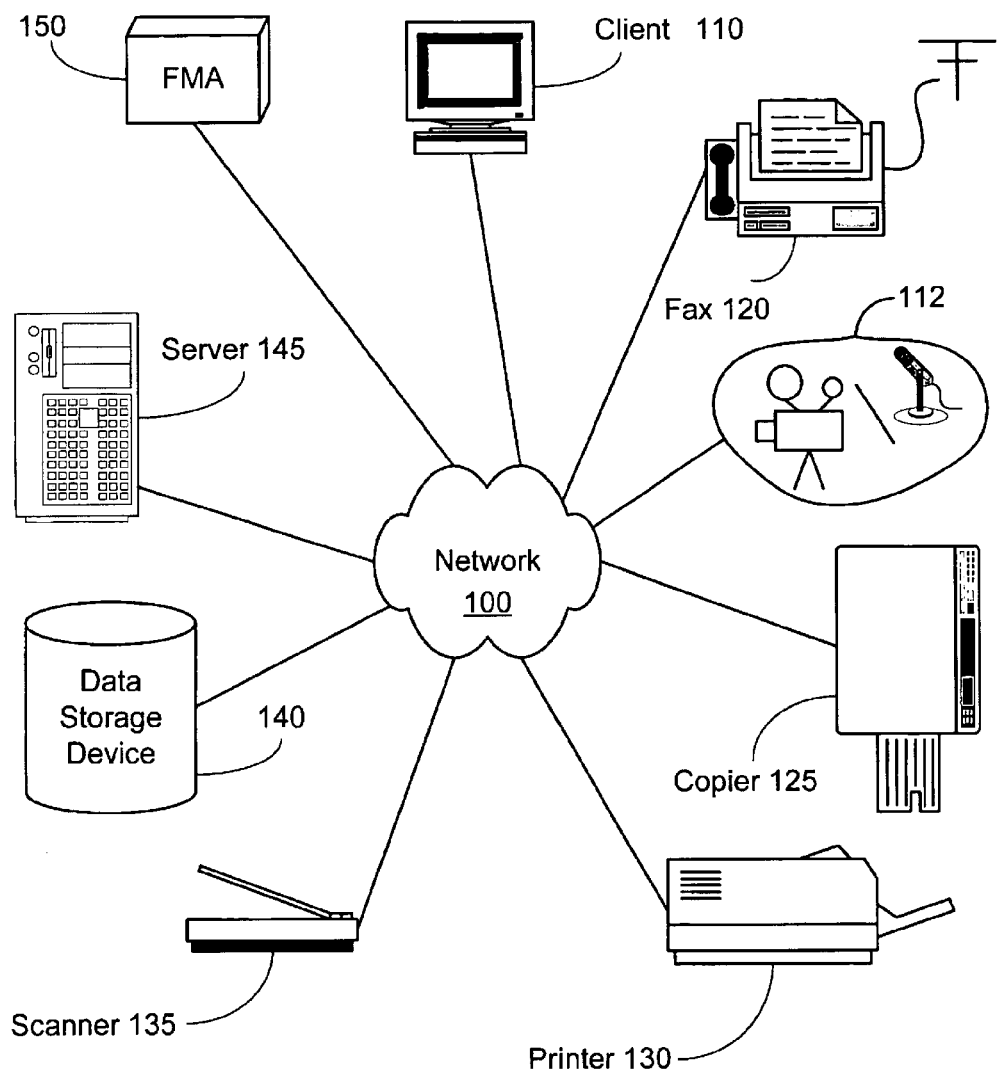
FIG. 1 illustrates one embodiment of a networked system containing an FMA.

A file management appliance and system is disclosed. In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for the reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, although the present invention may be described with reference to a particular programming language, it will be appreciated that a variety of programming languages may be used to implement the teachings of the invention as described herein.

Although all or some of the operations may be performed by software executing on one or more processing devices (e.g., CPUs), on a computer system or specialized apparatus, some or all of these operations may be performed by digital logic and/or circuitry, an integrated circuit (e.g., ASIC) or other semiconductor substrates.

System Overview

A file management appliance ("FMA") is a device that utilizes multiple processes and queues to provide document capture and indexing services to a network. In one embodiment, the FMA device is implemented as a thin server utilizing a pared-down UNIX based operating system. In another embodiment, the FMA provides to users a web-based interface to a set of documents captured through a variety of sources. In yet another embodiment, the FMA utilizes web-based common gateway interface (CGI) scripting to provide standardized user input and display. To the end-user, the FMA appears as a search engine for their local network. To other devices on a shared network, the FMA is an appliance that enables document capture. The document capture may use standard Internet protocols.

The FMA may be a networked office appliance (NOA) and may be part of a networked office appliance architecture. Both the networked office appliance and supporting architecture are described in copending nonprovisional application Ser. No. 09/191,277, filed Nov. 12, 1998 and entitled "Method and Apparatus for Automatic Network Configurations," assigned to the corporate assignee of the present invention—and incorporated herein by reference.

Briefly, in one embodiment, a NOA architecture enables appliances to be added to a network without requiring configuration or setup in offices or environments lacking a network administrator. At the same time, a NOA architecture enables appliances to be easily added to standard administered networks without causing conflicts with preexisting network devices. Furthermore, NOAs work closely together in networked environments and are able to automatically detect and share information with one another upon being connected to a network.

A NOA architecture provides mechanisms for automatically configuring devices on networks, such as, for example, TCP/IP networks. Specific configuration methods that may be provided include network address allocation, Domain Name Service (DNS) database population, network service discovery, and user identity sharing. Devices that follow these algorithms automatically start DHCP and DNS services when they are not already present on a network, and refrain from doing so if such services are already present on a network. Both DHCP and DNS services work together to provide names and addresses to network devices on the same network without human intervention (automatically). In addition, a hypertext transfer protocol (HTTP) based method of securely sharing service information as well as user and group information is defined.

By being a NOA device, the FMA is able to provide configuration services, including DHCP and DNS, as well as user and group lists to a network when needed. The FMA is also able to provide an HTTP based common interface with other NOA devices. Once the FMA is connected to a network, the FMA detects NOA backup devices and systematically announces or publishes its presence to other NOA devices.

FIG. 1 illustrates a block diagram of one embodiment of a networked system containing an FMA. Referring to FIG. 1, client 110 represents a general purpose digital computer connected to network 100 and equipped to execute various application programs including an electronic mail application. Network 100 may represent a local area network (LAN), an intranet, the Internet, or any other interconnected data path across which multiple devices may communicate. Also connected to network 100 is multimedia source 112, facsimile machine 120, copier 125, printer 130, scanner 135, data storage device 140, server 145, and FMA 150. In one embodiment, FMA 150 is equipped to capture data transmitted to and from one or more devices connected to network 100, including those devices shown in FIG. 1.

Multimedia source 112 represents one or more audio and video input devices connected to network 100. Multimedia source 112 may represent one or more microphones and/or video cameras that may provide both analog and digital data to network 100.

Facsimile machine 120 is connected to network 100 and represents a device capable of transmitting and receiving data such as text and images over a telephone line ("faxing"). In one embodiment, facsimile machine 120 may transmit text and images originating in printed form, or in another embodiment, facsimile machine 120 may transmit electronic data originating from any number of devices connected to network 100. Similarly, in one embodiment, facsimile machine 120 may print a hard copy of the received data, or in another embodiment, facsimile machine 120 may forward the received data to any number of devices connected to network 100.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction peripheral device may replace any combination of these devices. It should also be noted that any number of devices may be omitted from or added to network 100 without parting from the spirit and scope of the present invention.

FIG. 1 also depicts data storage device 140 as being connected to network 100. In one embodiment, data storage device 140 represents a removable storage medium such as, for example, a CD-ROM, DVD-ROM, DVD-RAM, DVD-RW, or magnetic tape. In an alternative embodiment, data storage device 140 represents a non-removable storage medium such as a hard or fixed disk drive. In one embodiment, data storage device 140 is a NOA archiving device.

Server 145 represents a general purpose digital computer connected to network 100 and is configured to provide network services to other devices connected to network 100. In one embodiment, server 145 provides file sharing and printer services to network 100. In another embodiment, server 145 is a Web server that provides requested hypertext markup language (HTML) pages or files over network 100 to requesting devices. In yet another embodiment, server 145 is a NOA server capable of providing configuration services to network 100.

FMA 150 is a file management appliance that is connected to network 100 and provides document capture and indexing services to the network. In one embodiment, FMA 150 is a NOA device capable of providing configuration services in addition to document capture and indexing services to network 100. In one embodiment, FMA 150 is not directly connected to any device, but rather is communicatively coupled to other devices through network 100. As an NOA, FMA 150 is equipped to publish its presence to other NOA devices on network 100 using the HTTP protocol.

Document capture (to be discussed more fully below) is the process by which one device requests an archiving device, such as data storage device 140, to archive a document. In one embodiment, the process is performed using standard Internet protocols. In one embodiment, the requesting device and the archiving device are both NOA devices. In another embodiment, FMA 150 is the requesting device.

In the FMA environment, a document may comprise a single file. In one embodiment, the term document is used synonymously with the term "document directory" to represent these documents. A document may be composed of many distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is able to process multiple image file formats including the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb. In one embodiment, FMA 150 is equipped to interpret compound filename extensions. For example, a file that contains thumbnail images in a tagged image file format may be represented as filename.thumb.tiff. In an embodiment, FMA 150 uses the page number of the document as the filename. In such a manner, a document may be represented by multiple files located in the same directory, each representing a different page of the document as reflected by the filename. For example, 01.thumb.jpg would represent a thumbnail image of page number one in joint photographic experts group format. Similarly, 12.thumb.tiff would represent a thumbnail image of page number twelve in tagged image file format.

Referring back to FIG. 1, FMA 150 may index data captured from various devices connected to network 100 including printer 130, facsimile machine 120, client 110, and scanner 135. In one embodiment, facsimile machine 120 captures data over a telephone line and subsequently sends at least part of the received data to FMA 150 over network 100. In another embodiment, data sent from client 110 to facsimile machine 120 over network 100 is transparently (e.g., unbeknownst to the device) captured and at least part of the data is routed to FMA 150 for indexing. In an alternative embodiment, facsimile machine 120 is located internal to client 110 thereby eliminating the need for client 110 to send data over network 100. In such an embodiment, FMA 150 nonetheless receives at least part of the captured data. In one embodiment, FMA 150 receives bibliographic-type data, or "metadata" extracted from the document. In one embodiment, data received from facsimile machine 120 is composed in TIFF format, whereas data received from client 110 may retain its original format upon transfer.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, contents.txt and contents.pdf are created and used by FMA 150 to index the full text of the document and return page images as a document file respectively.

In one embodiment, FMA 150 is capable of providing the same functionality as any one or more of the devices on network 100 thereby eliminating the need for these additional specialized devices. In another embodiment, however, FMA 150 is implemented as a thin server containing just enough hardware and software to support document capture and indexing over network 100.

Figure 2:
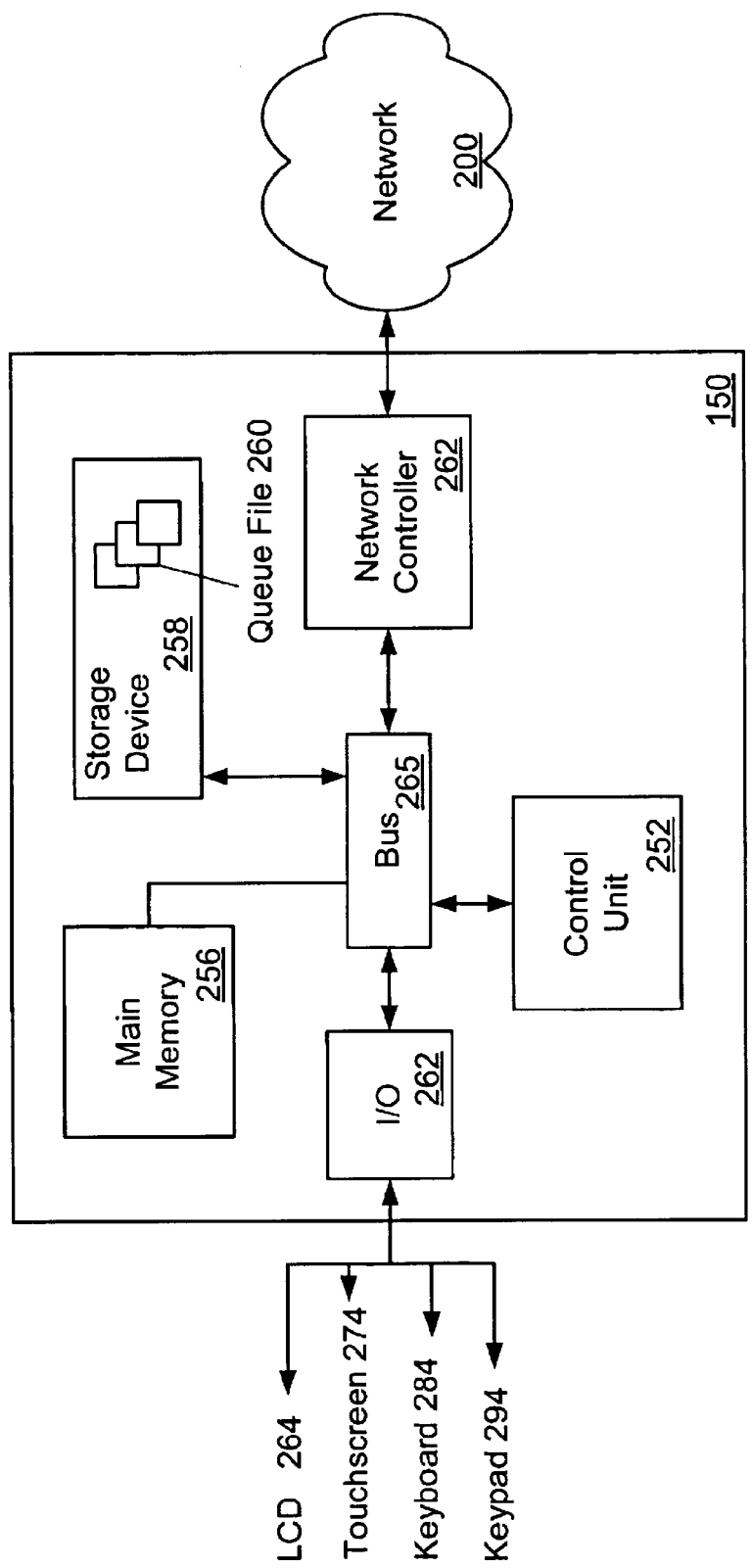
FIG. 2 is a block diagram illustrating an FMA hardware implementation according to one embodiment of the present invention.

FIG. 2 is a block diagram illustrating one embodiment of an FMA hardware implementation. Referring to FIG. 2, in one embodiment, FMA 150 includes control unit 252, I/O device 254, main memory 256, storage device 258 and network controller 262, all of which are connected through bus 265. Control unit 252 controls the overall operation of FMA 150 and may be implemented in any manner known in the art. In one embodiment, control unit 252 comprises a general purpose microprocessor known in the art to process data. Main memory 256 may be random access memory (RAM), read only memory (ROM), programmable read only memory (PROM), erasable programmable read only memory (EPROM), or any other memory device known in the art. In addition to main memory 256, FMA 150 may also contain a secondary memory unit (not shown). In one embodiment, FMA 150 utilizes a pared-down version of a UNIX-based operating system in which superfluous UNIX commands not required by FMA 150 are removed. In such an embodiment, control unit 252 extracts, decodes, and executes instructions from main memory 256. In one embodiment, FMA 150 may execute instructions in place within main memory 256.

I/O device 254 is connected to bus 265 and enables input into and output from FMA 150. I/O device 254 may be implemented using any general purpose input/output device known in the art. I/O device 254 may also be connected to any number of display devices such as liquid crystal display 264 or touch-sensitive screen 274, as well as any other display device not depicted in FIG. 2, but nonetheless known in the art. I/O device 254 may also be connected to any number of data input devices known in the art. FIG. 2 shows keyboard 284 and keypad 294 connected to I/O device 254, but any other general purpose input device may be connected in addition to, or in place of keyboard 284 and keypad 294. In one embodiment, I/O device 254 is internal to FMA 150 as shown in FIG. 2. In another embodiment, I/O device 254 may be external to FMA 150.

Network controller 262 is connected to bus 265 to enable FMA 150 to communicate over network 200. Network controller 262 may be implemented as a network interface card, an application specific integrated circuit (ASIC) or in any other manner known in the art so as to provide network connectivity to FMA 150. In one embodiment, as shown in FIG. 2, network controller 262 is internal to FMA 150. In another embodiment, network controller 262 may be external to FMA 150.

Storage device 258 is connected to bus 265 and represents any nonvolatile memory device known in the art. Storage device 258 may utilize a removable storage medium such as a CD or DVD, or storage device 258 may utilize a non-removable storage medium such as a hard/fixed disk. Queue file 260 (discussed in more detail below) represents documents stored in an ordered manner on storage device 258.

Queues

In one embodiment, the FMA operating environment enables a number of simultaneously executing processes or daemons to operate on one or more processing queues. The FMA uses a combination of files and directories, also referred to as documents, to form such queues. In one embodiment a queue file, such as queue file 260, contains a list of document locations each separated by a new line character.

Figure 3:
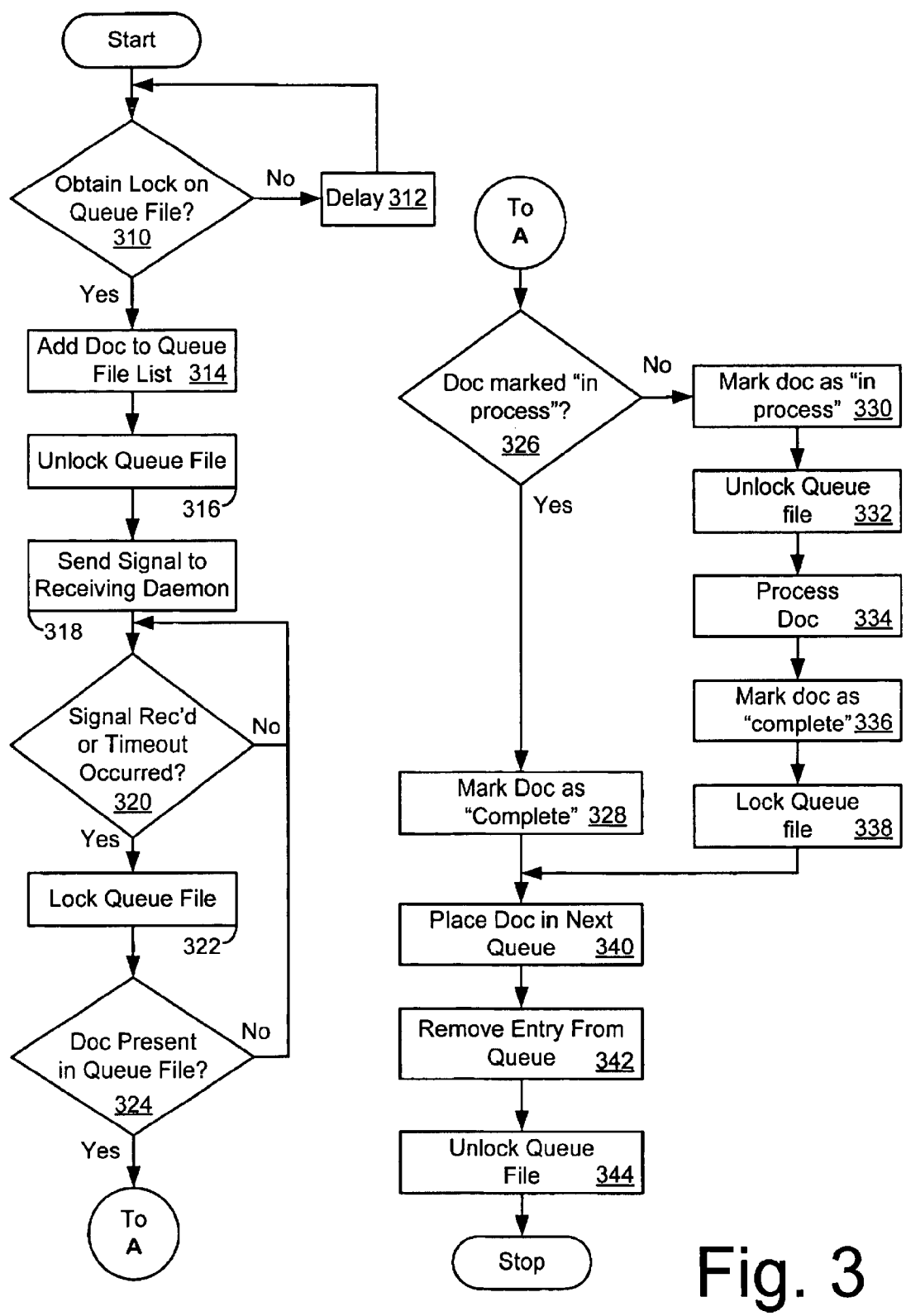
FIG. 3 is a flow diagram illustrating one embodiment of FMA queue processing.

FIG. 3 is a flow diagram illustrating one embodiment of FMA queue processing. Referring to FIG. 3, FMA 150 first attempts to obtain a lock on a receiving queue file (processing block 310). In one embodiment, FMA 150 uses a metadata file (discussed more fully below) to indicate whether the lock on the receiving queue file may be obtained. If FMA 150 is not able to obtain a lock on the receiving queue file or its corresponding metadata file, FMA 150 delays a predetermined amount of time (processing block 312) before attempting to obtain a lock on the receiving queue file once again (processing block 310). Once FMA 150 is able to obtain a lock on the receiving queue file, FMA 150 then adds the document to the receiving queue file's list of documents (processing block 314). After completing the document addition, FMA 150 unlocks the receiving queue file (processing block 316) and signals the receiving daemon that there are entries in the receiving queue file waiting to be processed (processing block 318).

When the receiving daemon detects such a signal indicating the presence of a document in the receiving queue file, or alternatively, if a timeout occurs prior to the receiving daemon detecting such a signal (processing block 320), the receiving daemon locks the receiving queue file (processing block 322) and determines whether, in fact, there is a document present in the receiving queue file for processing (processing block 324). If no documents are present in the receiving queue file, the receiving daemon returns to a sleep mode where it once again waits for either a signal indicating the presence of a document in the receiving queue file, or for a timeout to occur. If, however, a document is present in the receiving queue file (processing block 324), the receiving daemon then determines whether that document is marked as being "in process" (processing block 326). If the document is marked as being "in process", there is a chance that a previously executed daemon process had terminated prematurely, and the receiving daemon therefore marks the document as "complete" without processing the document (processing block 328). If, however, the document was not marked as "in process" (processing block 326), then the receiving daemon marks the document as "in process" (processing block 330), unlocks the receiving queue file (processing block 332), and continues to process the document normally (processing block 334). After processing the document, the receiving daemon marks the document as "complete" (processing block 336) and proceeds to lock the receiving queue file once again (processing block 338). Once the document is marked as "complete" (whether from processing block 328 or processing block 336), the receiving daemon places the document into the next queue (processing block 340) and removes the document entry from the receiving queue (processing block 342). Lastly, the receiving daemon unlocks the receiving queue file (processing block 344) to allow further document processing.

Metadata

In one embodiment, each document captured within an FMA system is stored on the FMA as a separate UNIX directory that includes a metadata file. In one embodiment, the metadata file contains special information about the document such as, for example, bibliographic data extracted from the capturing device. In one embodiment, document metadata consists of pairs of attribute names and their values.

FIG. 4 is a table illustrating one embodiment of an FMA metadata file. In FIG. 4, document metadata attributes are listed along with each attribute's meaning.

FIG. 5 is a table illustrating a second embodiment of an FMA metadata file. In FIG. 5, document metadata attributes are listed along with their acceptable value types.

FIG. 6 illustrates one embodiment of an FMA metadata file in extensible markup language (XML). The partial metadata code depicted in FIG. 6 is illustrative of what might be produced for a document that was captured by user "jones" (line 640), is owned by user "jones" (line 630), has serial number "883639" (line 620), and was backed up by a NOA (line 690). Furthermore, the metadata code shown in FIG. 6 shows that the document was processed by OCR and compression (lines 660 and 670), has been indexed (line 680), and has been backed up to disk 37 (line 690).

In the event that an FMA or NOA encounters a metadata file that is not well-formed (as defined by the XML specification available from the World Wide Web Consortium (W3C) at http://www.w3.org), then in one embodiment, that FMA or NOA replaces the metadata with a well-formed file which includes all information it can verify about the document. This might result in a completely empty metadata file that is well-formed but contains no attribute/value pairs. Although in one embodiment, the metadata files and data field definitions represented in FIGS. 4, 5 and 6 are implemented according to the XML specification, other programming language implementations may equivalently be utilized such as, for example, HTML, standard generalized markup language (SGML) or any other language known in the art to provide similar functionality. In one embodiment, in order to add or remove items from the metadata file, the FMA uses a small software library or routing to parse the metadata file as well as perform file locking, reading, writing, and deletion tasks for documents or items of metadata.

The FMA may also maintain a master document list that manages documents on the FMA. In one embodiment, the master document list is a single repository that points to information about all documents that have ever been captured on the FMA. In one embodiment, the master document list maintains the same attributes as are found in the metadata file shown in FIGS. 4, 5 and 6. Any database capable of content indexing may be used to implement the master document list.

Document Capturing

Document capture is an operation in which an NOA device requests an archiving NOA device to archive a document. Within an FMA environment, document capture may be performed by any network entity or device that wants to capture to the NOA device. In one embodiment, document capture is automatically performed upon all documents within an FMA system, whereas in another embodiment, only selected documents are captured in response to a user setting. For example, the user may press a button that prevents documents from being automatically captured. In one embodiment, document capture utilizes standard Internet protocols enabling the capture of multiple documents, or multiple files associated with a single document.

In one embodiment, HTTP is used as the capture protocol. Using the HTTP POST operation, for example, files of various formats including archive formats, may be captured by the FMA. Such archived files may contain collections of distinct named data files or data blocks, and may comprise archive formats such as the tape archive (tar) format, the zip, gzip and pkzip formats, the StuffIt format, and the like.

In another embodiment, an implementation of the Internet File Transfer Protocol (FTP) is used as the capture protocol, whereby documents are captured either as multipurpose Internet mail extension (MIME) files in the default FTP directory, or as subdirectories of the default directory. The actual name of the document directory is not important during document capture since the name of the document is not stored as part of the directory system of the NOA, but is instead stored within the metadata file. In one embodiment, the document's capture date is used for the name of the document directory. In addition, a unique identifier, such as a serial number, may be assigned to each document and stored in the document's metadata file (shown in FIGS. 4, 5 and 6 as 420, 520, and 620 respectively).

Figure 7A:
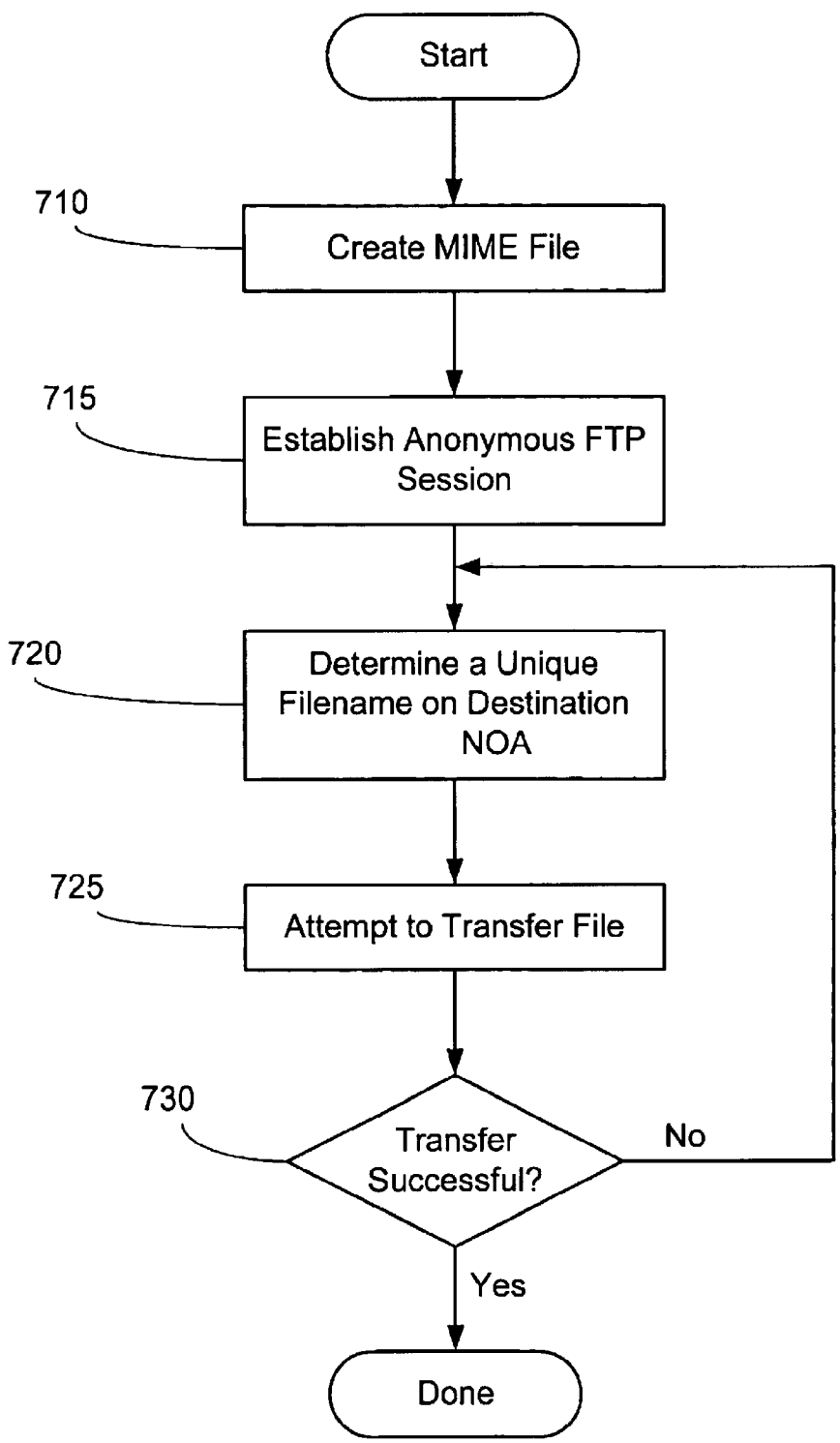
FIG. 7A is a flow diagram illustrating one embodiment of MIME capturing in an FMA environment.

FIG. 7A illustrates a flow diagram of one embodiment of MIME capturing used in one embodiment of an FMA environment. Referring to FIG. 7A, a NOA capturing device creates a MIME multi-part file, including one or more content files and a metadata file (processing block 710). After creating the MIME file, the NOA capturing device then attempts to establish an anonymous FTP session with the destination NOA device (processing block 715). Once an FTP session is established, the capturing device determines a filename that is a unique on the destination NOA device (processing block 720) and attempts to transfer the file to the destination NOA device (processing block 725). If the transfer fails, the capturing device obtains a new filename and attempts the file transfer again. The capture is complete upon a successful file transfer (processing block 730).

Figure 7B:
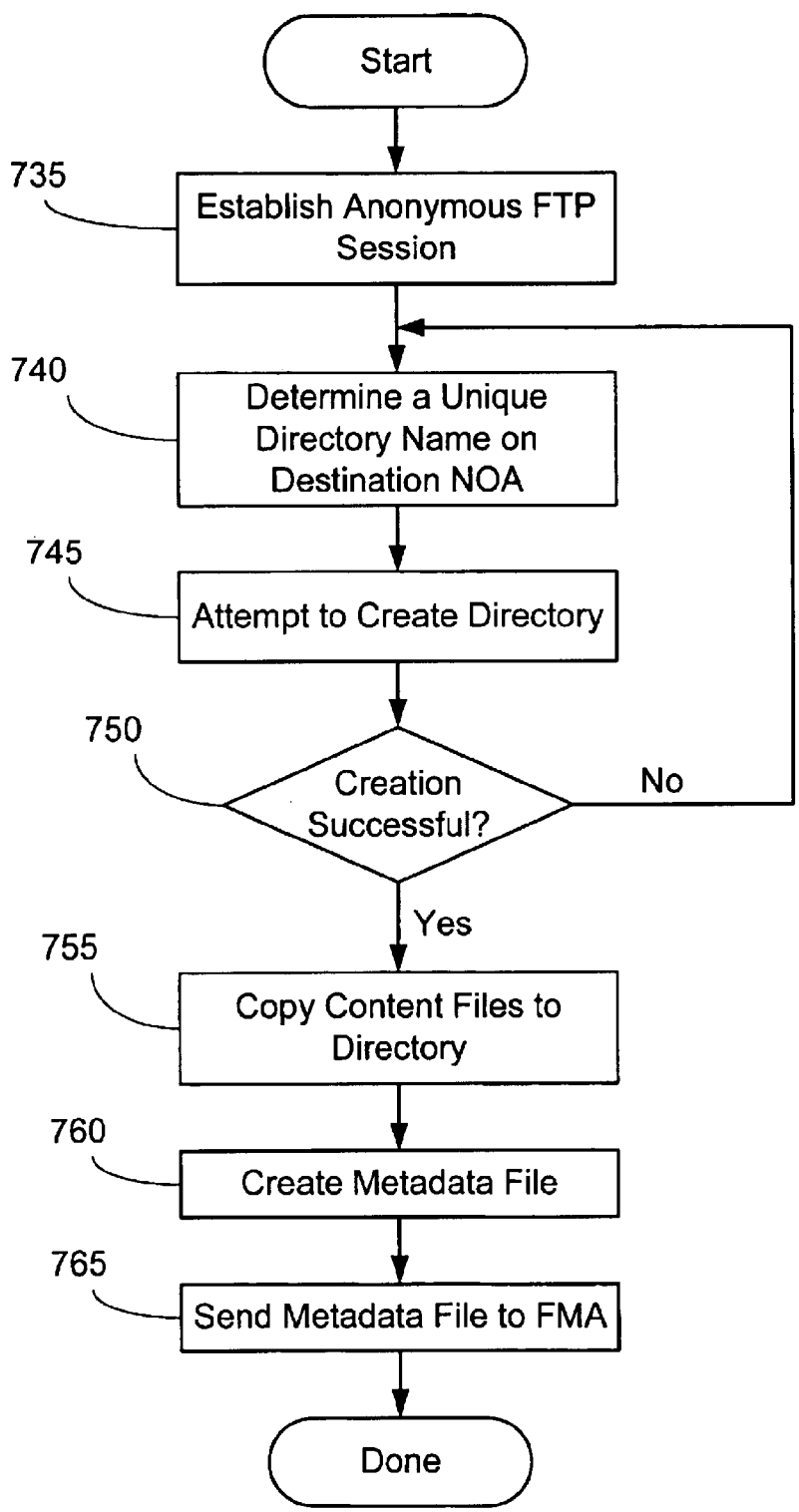
FIG. 7B is a flow diagram illustrating one embodiment of directory capturing in an FMA environment.

FIG. 7B illustrates a flow diagram of one embodiment of directory capturing in one embodiment of an FMA environment. Referring to FIG. 7B, the capturing device establishes an anonymous FTP session with the destination NOA (processing block 735). Once the FTP session is established, the capturing device determines what it assumes to be a unique directory name (to be more fully discussed below) on the destination NOA (processing block 740). Once a directory name is determined, the capturing device attempts to create a directory with that name on the destination NOA device (processing block 745). If the attempt to create the directory is unsuccessful, whether due to a duplicate directory name or otherwise, the capturing device determines another directory name and attempts to create the directory again (processing blocks 750, 740 and 745). If, however, the capturing device successfully creates the directory on the destination NOA device (processing block 750), the capturing device then copies the content file or files to the newly created directory (processing block 755). The capturing device also creates a metadata file (processing block 760) which is then sent to the FMA device (processing block 765) to complete the process.

Figure 7C:
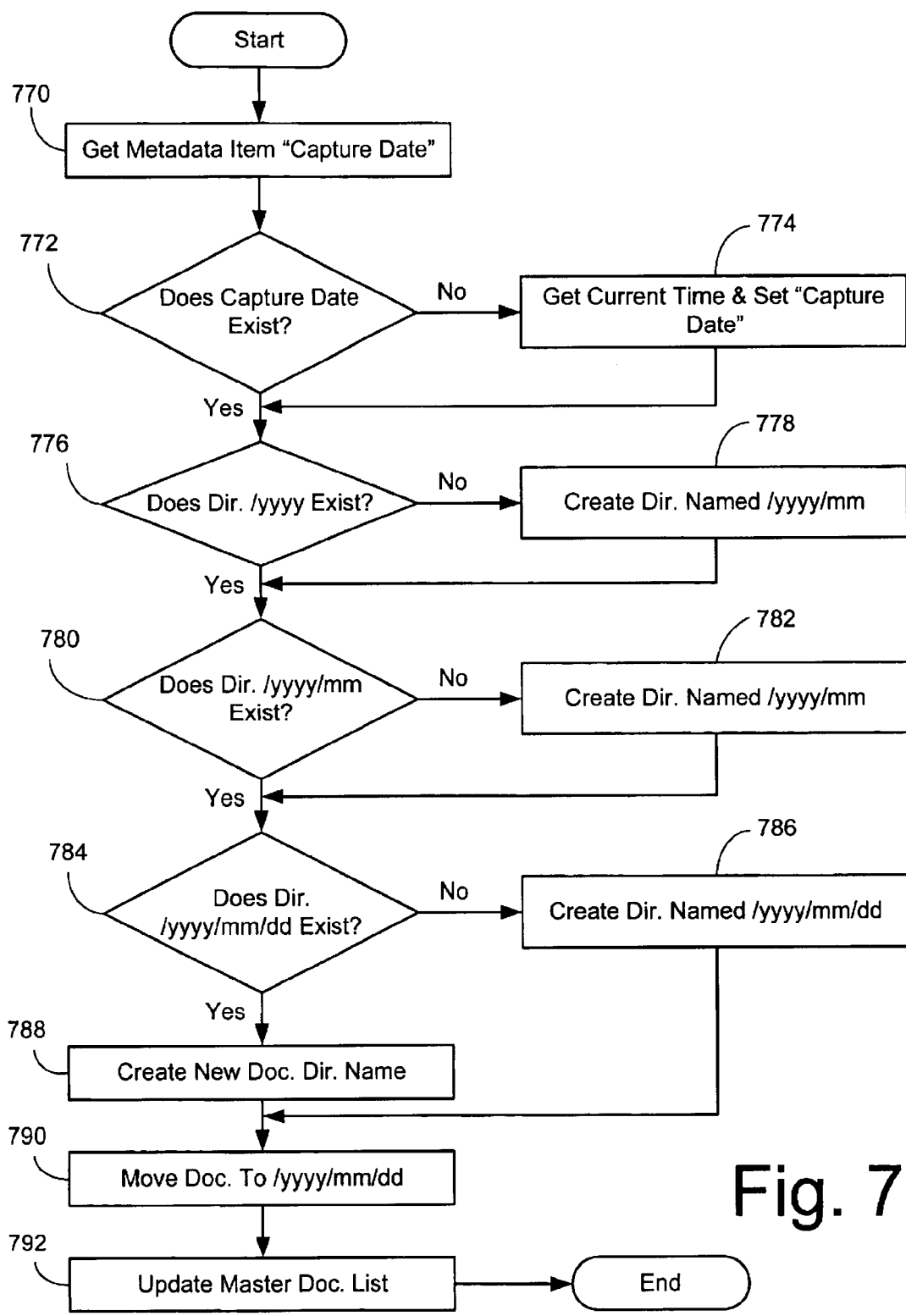
FIG. 7C is a flow diagram illustrating one embodiment of the document storage process in an FMA environment.

FIG. 7C illustrates a flow diagram of one embodiment of the document storage process in an FMA environment. During the document storage process, the FMA or NOA creates appropriate directories, moves the document to the appropriate directory, and updates the master list. Referring to FIG. 7C, the metadata file of the document to be stored is accessed and information from its "Capture date" field (see items 450 and 550 in FIGS. 4 and 5 respectively) is retrieved (processing block 770). If the document's "Capture date" or even the metadata file does not exist, then the current system time is obtained and used as the document's "Capture date" (processing block 774). If, however, the document's "Capture date" does exist, the system determines whether an appropriately named directory exists. In one embodiment the document directory is represented by "yyyy/mm/dd" where yyyy represents the year in which the document was created, mm represents the ordinal month in which the document was created, and dd represents the day of the month in which the document was created. Referring once again to FIG. 7C, the system determines whether a directory exists as reflected by the appropriate four-digit year (processing block 776). If a directory reflecting the appropriate year does not exist, the system creates such a directory (processing block 778). If a directory reflecting the appropriate year does exist, however, the system then checks whether a directory reflecting the appropriate month exists within that year directory (processing block 780). If the appropriate month directory does not exist within the year directory, the system creates a month directory within the year directory (processing block 782). If the appropriate year and month directories exist, the system finally checks whether the appropriate day directory exists within the nested year/month directory (processing block 784). If the day directory does not exist, the system creates the appropriate day directory within the year/month directory (processing block 786). If, however, a directory reflecting the appropriate year, month and day already exists, the system creates a new document directory name into which the document will be stored. In one embodiment, the system generates a four-digit random number that gets appended to the end of the existing document directory name (processing block 788). Once a unique document directory name is established (processing blocks 786 and 788), the document is moved to that directory (processing block 790) and the master document list is updated to reflect the document's new location (processing block 792).

One or More Exemplary Embodiments of Web & User Interfaces

The FMA utilizes a variety of graphical input and display pages to form the FMA user interface. In addition, the FMA is equipped with a graphical web-based interface that enables the FMA to send and receive data over a network connection.

Through the FMA web interface, a user is able to search for and retrieve documents that have been captured by the FMA. In one embodiment, the FMA utilizes metadata attributes such as those shown in FIGS. 4 and 5, to enable integrated retrieval of captured documents using both time oriented and content oriented queries. In one embodiment, a user may perform subsequent queries on any found set of documents resulting from a first query. Thus, a user may generate a time-oriented query based on the results of a content-oriented query and conversely, a user may generate a content-oriented query based on the results of a time-oriented query. Additionally, a user may want to generate a new query, but rather make an adjustment to a previous query. In one embodiment, a user can return to a previous query form containing previously submitted field entries and reform the query by entering the appropriate search criteria.

The FMA is equipped to save queries as separate documents residing in the FMA and to search for previously saved queries using either time or content-based search criteria. Additionally, the FMA provides a mechanism by which a user may add selected documents, including query results, displayed on one or more pages to a repository or "stack" for later viewing. In one embodiment, the FMA adds documents to a stack by writing each document's identification or serial number contained within the document's metadata file to the end of a stack contents file. In one embodiment, if a saved query is added to the stack, an HTML page representing the query is appended to the stack. Stack contents may be displayed in a manner similar to which document query results are displayed, such as, for example the list view described below.

In one embodiment, the FMA uses CGI scripting to generate one or more web pages to display specific query results. FMA query results may be graphically displayed in a variety of time-oriented views such as, for example, a list view and a calendar view, or in a variety of content-oriented views such as, for example, a stream view and a thumbnail view. In one embodiment, a user may selectively alternate between each query result view depending upon the document display preferences.

Figure 9A:
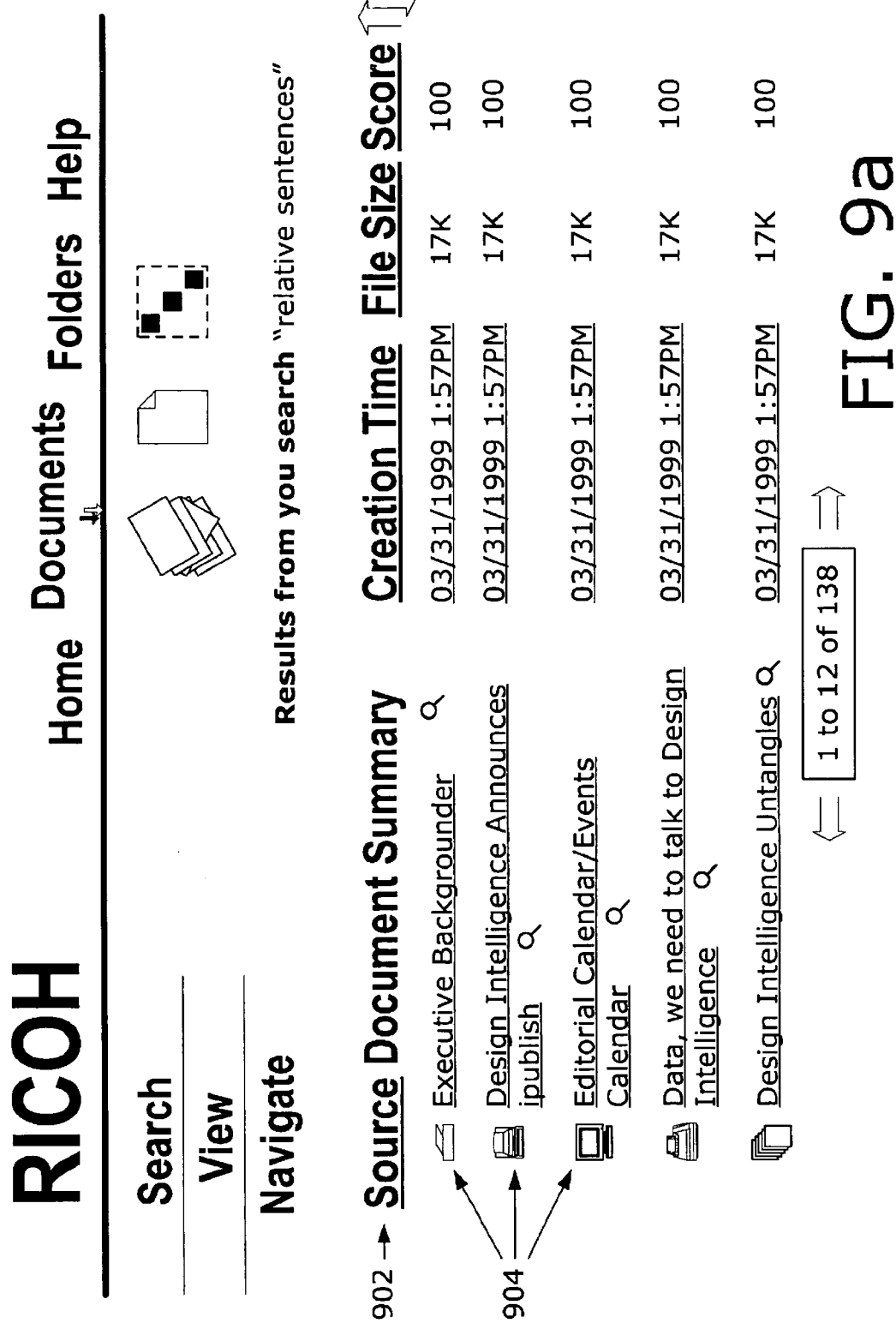
FIG. 9A illustrates an exemplary FMA query results page showing a list view.

The list view of the present invention enables large quantities of textual information about many documents to be communicated to a user. FIG. 9A illustrates one embodiment of an FMA query results page showing a list view. Referring to FIG. 9A, a listing of documents satisfying a query of "relative sentences" is shown. Within the list view, query results may be sorted by a variety of criteria such as, for example, creation source (the device that created or captured the document), creation time, file size, and search result score, all indicated by reference number 902. Source icons 904 graphically indicate to a user the device through which the associated document was created or captured. In one embodiment, a particular document's capture source is identified within the document's metadata file (shown by reference numbers 445 and 545 in FIGS. 4 and 5 respectively). In one embodiment, if a user double clicks on a source icon or associated document, the document is retrieved via FTP to the users machine.

Figure 9B:
FIG. 9B illustrates an exemplary FMA query results page showing a calendar view.

In one embodiment, the calendar view provides a view of query results that is formatted to resemble a standard monthly calendar. The calendar view provides users with an event-based view of particular query results and may also serve as a document density indicator of activity. In one embodiment icons representing captured documents are graphically displayed in a location on the calendar corresponding to the day upon which they were captured. In such an embodiment, the number of icons that are displayed for a given date on the calendar corresponds to the number of documents that were captured on that date. In other embodiments, documents or icons representing documents may be displayed on the calendar according to their creation date rather than capture date, or according to both their creation dates and capture dates. FIG. 9B illustrates one embodiment of an FMA query results page showing a calendar view. In one embodiment, if a user points to a document source icon while in the calendar view, a thumbnail version of the document is displayed as an inset within the screen. Likewise, if a user selects a particular icon by "double clicking" on the icon for example, the document is downloaded.

Figure 9C:
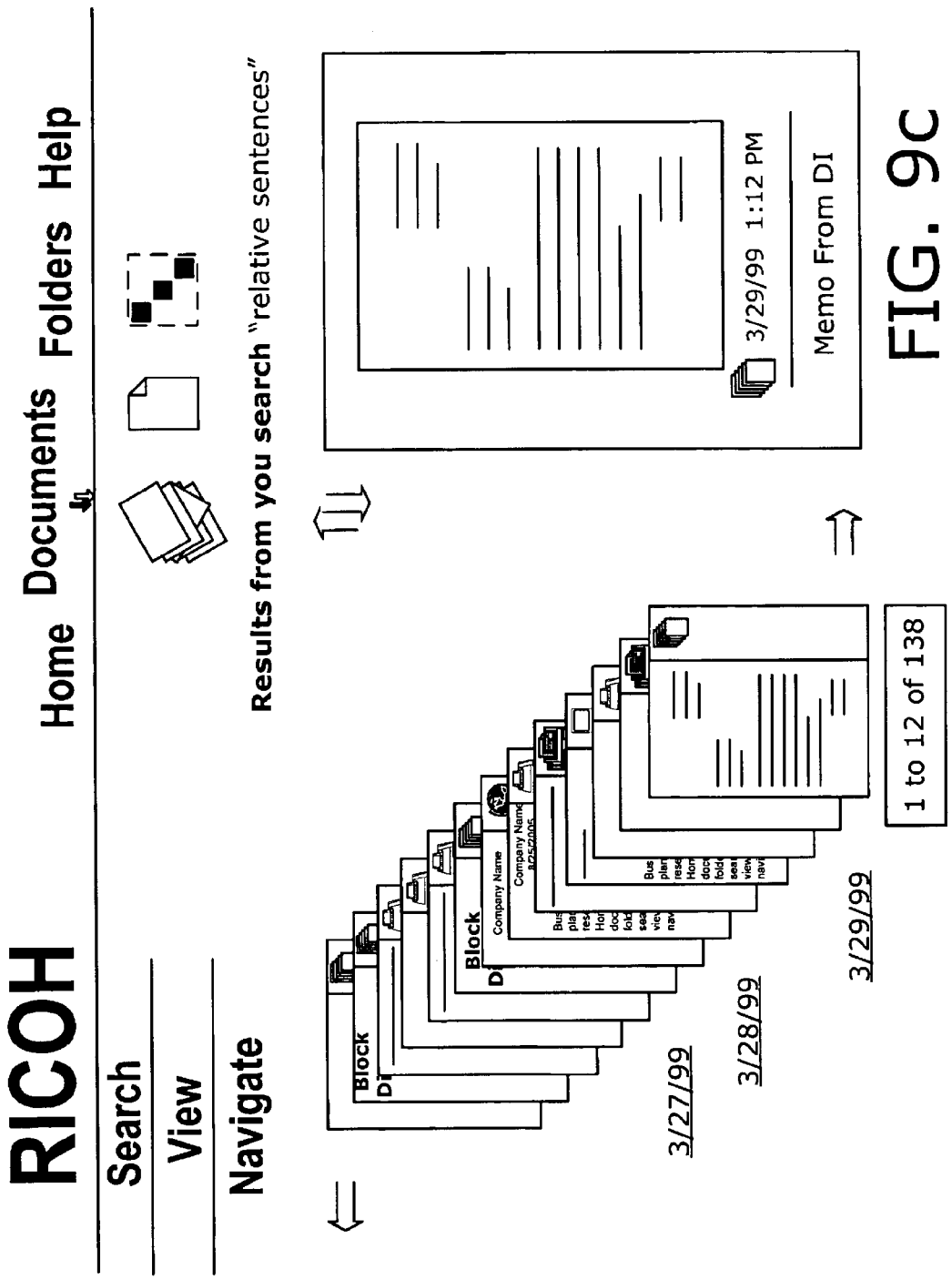
FIG. 9C illustrates an exemplary FMA query results page showing a stream view.

The stream view of the present invention presents query results as a graphical stream of documents arranged by time of capture. In one embodiment, the first page of each resulting document and its corresponding capture date are graphically displayed a tiled manner whereby each document is slightly offset from each other document. In one embodiment, the capture date is a hyperlink that when selected, causes the FMA to display a new page containing documents that were captured on the selected date. In one embodiment, a secondary document view is also provided, whereby when a document is selected in the stream view, a magnified version of the document is displayed along with summary information in an accompanying window upon the display. FIG. 9C illustrates one embodiment of an FMA query results page showing a stream view. In one embodiment, the thumbnail view is similar to the stream view described above. In one embodiment, the thumbnail view graphically displays the first page of each resulting document as a thumbnail image. In one embodiment, the thumbnail images are displayed side-by-side within the thumbnail view. FIG. 9D illustrates one embodiment of an FMA query results page showing a thumbnail view.

Document Ownership

An owner of a document on an FMA is permitted to perform various operations with respect to that document including for example, viewing the document, changing the ownership of the document, expunging the document, and copying the document to another owner. Due to the breadth of control an owner has over a particular document, access to the files on the FMA is controlled under a "single owner" model of ownership. That is, every document contains an owner field that specifies which user or users are allowed to access or view the document. Owners on the FMA may be designated as individual users or may be designated as groups of users. If a group is specified as the owner of a document, then every member of that group is treated as the owner of the file. In one embodiment, each document on the FMA may be designated as being public, whereby ownership of the document is not changed but all users are allowed to view the document. In one embodiment, the user and group name space used for ownership access is the same user and group name space used to provide HTTP authentication to the web server.

An Exemplary Embodiment of Document Flow

Figure 8:
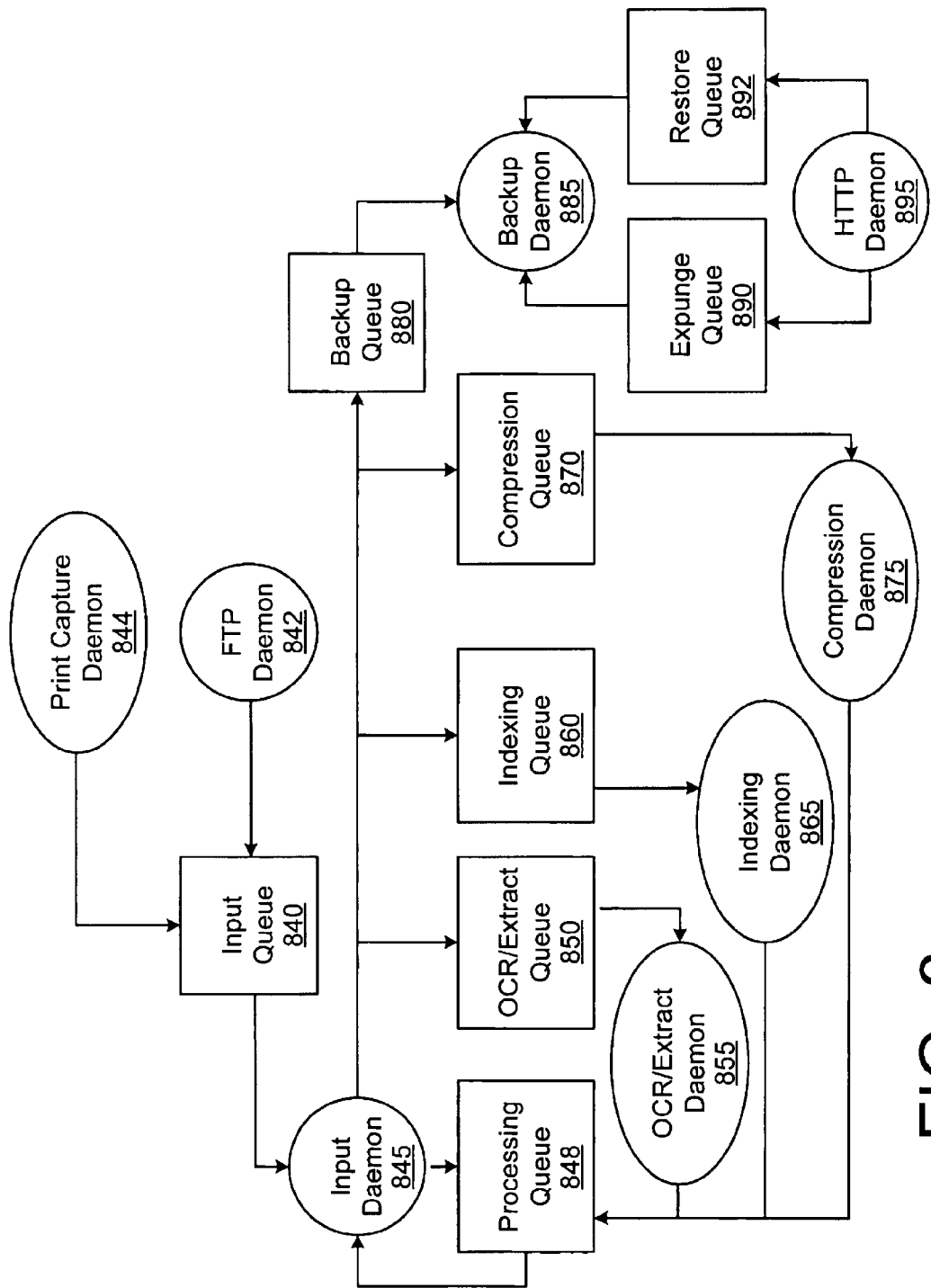
FIG. 8 illustrates one embodiment of document flow between daemons and queues of an FMA.

FIG. 8 illustrates one embodiment of document flow between daemons and queues of FMA 150. Referring to FIG. 8, an input daemon 845, FTP daemon 842, print capture daemon 844, OCR/extract daemon 855, indexing daemon 865, compression daemon 875, backup daemon 885, and HTTP daemon 895 are all coupled together using a series of queues. The queues inform the daemons of the presence of documents for processing. Input daemon 845 is a data capture manager that manages the initial processing of each document captured by the file management system. Primarily, input daemon 845 monitors two queue directories, input queue 340 and processing queue 848, and invokes processing tasks on the contents of the two directories. Input queue 840 is filled with document directories by FTP daemon 842, which provides a capture interface for the file management system, or by print capture daemon 844, which transparently captures a copy of each print job being printed. Input daemon 845 detects these documents and moves them to processing queue 848. While documents remain in processing queue 848, input daemon 845 periodically checks the documents to determine if another task can be invoked.

When input daemon 845 invokes a task, it forwards a document from processing queue 848, to either compression queue 870, indexing queue 860, OCR/extract queue 850, or backup queue 880. Compression queue 870 feeds the document to the compression daemon 875, which attempts to compress document content files in order to save space and forwards the compressed document to processing queue 848. In one embodiment, compression daemon 875 may compress raw bit maps using MMR compression while compressing other content files using a zip format. Indexing queue 860 feeds the document to indexing daemon 865, which performs indexing on the document and subsequently forwards the indexed document back to processing queue 848. OCR and text extraction queue 350 feeds documents to OCR/Extract daemon 855 which performs optical character recognition on text and extracts image data from the document. Subsequently, OCR/Extract daemon 855 forwards the processed document back to processing queue 848.

Backup queue 880 is a file that represents a list of documents that need to be backed up by the file management system. Backup queue 880 is shared by many processes. Backup daemon 885 is coupled to backup queue 880 and performs a number of functions related to backup, document retention from backup, document expunging, and index file management. In one embodiment, backup daemon 885 is implemented as several distinct processes. One process manages the actual backup activity, another process manages asynchronous restoration for documents, and a third process manages the asynchronous expunging of documents.

Between backup daemon 885 and HTTP daemon 895 are restore queue 892 and expunge queue 890. Restore queue 892 represents a list of documents that need to be restored to the hard disk by the device, and expunge queue 890 represents a list of documents that need to be expunged by the device. HTTP daemon 895 provides web interfaces (e.g., pages) to show documents and/or status of documents in expunge queues 890 and restoration queue 892. HTTP daemon 895 may also provide web interfaces to show documents and/or status of documents in other queues of the file management system.

Reliability Enhancements

In order to decrease the chance of data corruption or even data loss, the FMA implements various mechanisms, such as a backup engine and restart daemon, to enhance reliability of FMA based systems.

The FMA backup engine includes a backup daemon that performs a number of functions related to backup, document restoration from backup, document expunging, and index file management. In one embodiment, FMA documents are backed-up as soon as possible. That is, FMA document backup requests are satisfied in a asynchronous manner, whereby the FMA processes the most "valuable" requests first. How valuable a request may be is heuristically determined by the FMA. Similarly, both entire and partial FMA documents may be restored from one or more backup mediums asynchronously. Additional information on one embodiment of backup and restore processes described herein may be found in copending nonprovisional application Ser. No. 09/191,277, filed Nov. 12, 1998 and entitled "Method and Apparatus for Opportunistic Queue Processing," assigned to the corporate assignee of the present invention and incorporated herein by reference.

The FMA system is also equipped to write parallel offsite backup disks in addition to the asynchronous file backup and restore procedures described above. During offsite backup, the FMA creates secondary backup disks that are designed to be taken offsite as needed. In one embodiment, the FMA offsite backup is an episodic program that is run as a result of direct user action. In one embodiment, the FMA offsite backup routine sequentially copies files to a removable storage media until all documents have been backed-up, or alternatively, until the recording media is full.

The FMA system is further equipped to recover the master document list database from both the contents of the hard disk as well as various backup devices. In one embodiment, each FMA document utilizes a bulk submit file to enable master document list database recovery. Each bulk submit file contains the complete list of document transactions for a particular document, along with corresponding timestamps indicating when each transaction took place. The FMA retains the bulk submit files and verifies that they get backed up whenever a record in the master document list database is changed. Every time a recovery is made of the master document list database, the corresponding bulk submit timestamps are referenced to determine whether the bulk submit file or the master document list database contains the more recent data.

Another such mechanism designed to enhance the reliability of an FMA based system is the restart daemon. The restart daemon is a master process that verifies the functionality of other daemon programs or processes, and restarts the processes if they have failed or stopped responding. In one embodiment, an additional process is implemented that verifies the functionality of restart daemon itself and reinitializes the restart daemon upon its failing.

Note that the processing performed herein is performed by processing logic, which may comprise hardware (e.g., dedicated logic, circuitry, etc.), software, or a combination of both.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

I claim:

1. An apparatus comprising:
   a network interface to receive an electronic document from a first device, the electronic document captured by the first device coupled to the network, wherein the document is captured by being saved in the absence of an explicit command by a user to the first device;
   a storage medium coupled with the network interface having one or more queues to store the captured documents; and
   a processor coupled with the storage medium to manage the one or more queues by maintaining one or more metadata files having attributes corresponding to capture of the electronic document, wherein the processor executes one or more daemons corresponding to the one or more queues using the metadata files to selectively lock the electronic document.

2. The apparatus defined in claim 1, further comprising a graphical user interface.

3. The apparatus defined in claim 2, wherein the graphical user interface comprises common gateway interface scripting accessible through the network interface.

4. The apparatus defined in claim 2, wherein the graphical user interface is operable to generate web-based display pages.

5. The apparatus defined in claim 1, wherein the network interface communicatively couples the apparatus to one or more capture devices over a network.

6. The apparatus defined in claim 5, wherein the network interface is operable to send and receive data using a file transfer protocol (FTP).

7. The apparatus defined in claim 5, wherein the one or more capture devices are networked office appliances.

8. The apparatus defined in claim 1, wherein a first queue of the one or more queues comprises at least one document directory.

9. The apparatus defined in claim 8, wherein the at least one document directory comprises one or more content files.

10. The apparatus defined in claim 8, wherein the at least one document directory comprises a metadata file that contains at least part of the captured document.

11. The apparatus defined in claim 1, wherein the storage medium comprises one or more of a fixed disk, removable disk, DVD-RW, DVD-RAM, and RAM.

12. The apparatus defined in claim 1, wherein the storage medium comprises a master document list that tracks the location of all documents on the apparatus.

13. A system comprising:
   a first device communicatively coupled to a network to capture an electronic document, wherein the document is captured by being saved in the absence of an explicit command by a user to the first device; and
   a second device communicatively coupled to the network and having:
      a network interface to receive at least partial capture data from the first device,
      a storage medium coupled with the network interface having one or more queues to store the at least partial capture data,
      a processor coupled with the storage medium to manage the one or more queues by maintaining one or more metadata files having attributes corresponding to capture of the electronic document, wherein the processor executes one or more daemons corresponding to the one or more queues using the metadata files to selectively lock the electronic document.

14. The system defined in claim 13, wherein the first device comprises a selected one of a printer, a copier, a facsimile machine, a scanner and a computer.

15. The system defined in claim 13, wherein the network interface receives captured data using a file transfer protocol (FTP).

16. The system defined in claim 13, wherein at least one of the first and second devices is a networked office appliance.

17. The system defined in claim 13, wherein both the first and second devices are networked office appliances.

18. The system defined in claim 13, wherein the at least partial capture data comprises document bibliographic information.

19. The system as defined in claim 13, wherein the one or more queues comprise a list of one or more document directories.

20. The system as defined in claim 13, wherein the storage medium is a magnetic fixed disk.

21. The system as defined in claim 13, wherein the user interface further comprises:
   a graphical user interface having a plurality of graphical document display views including:
      a list view, a calendar view, a thumbnail view, and a stream view.

22. A method comprising:
   capturing an electronic document on a first device, wherein the document is captured by being saved in the absence of an explicit command by a user to the first device; and
   communicating at least part of the captured data to a second device, wherein the second device:
      orders the at least part of the captured data into one or more queues,
      performs one or more processing operations on the one or more queues by maintaining one or more metadata files having attributes corresponding to capture of the electronic document wherein the second device executes one or more daemons corresponding to the one or more queues using the metadata files to selectively lock the electronic document,
      accepts one or more queries pertaining to the captured data, and
      responds to the one or more queries by displaying query results.

23. The method defined in claim 22, wherein the data is captured using a file transfer protocol (FTP).

24. The method defined in claim 22, wherein the second device orders the at least part of the captured data by creating a directory and copying the at least part of the captured data into the directory.

25. The method defined in claim 24, wherein the second device uses a capture date of the at least part of the captured data as a name for the directory.

26. The method defined in claim 22, wherein the processing operations comprise optical character recognition, indexing, compression and backup.

27. The method defined in claim 22, wherein the one or more queries are implemented using common interface gateway (CGI) scripting.

28. The method defined in claim 22, wherein the query results are displayed graphically in one or more view formats.

29. The method defined in claim 22, wherein the second device indexes the at least part of the captured data.

30. The method defined in claim 22, further comprising communicating and storing all the captured data on a third device.

31. The method defined in claim 22, wherein the query results are displayed graphically in a selectable one of a plurality of views.

32. The method defined in claim 31, wherein the plurality of views includes a list view, a calendar view, a thumbnail view, and a stream view.

* * * * *

UNITED STATES PATENT AND TRADEMARK OFFICE
CERTIFICATE OF CORRECTION

PATENT NO.        : 6,978,297 B1                                    Page 1 of 1
APPLICATION NO. : 09/410364
DATED             : December 20, 2005
INVENTOR(S)       : Piersol It is certified that error appears in the above-identified patent and that said Letters Patent is hereby corrected as shown below:

Title Page, Col. 2, In Item [ 56], Other Publications, Line 2, after " GB; " please insert - - Class T01, - -.

Signed and Sealed this

Fifteenth Day of August, 2006

JON W. DUDAS
*Director of the United States Patent and Trademark Office*